(12) United States Patent
Klerk

(10) Patent No.: US 7,755,984 B2
(45) Date of Patent: Jul. 13, 2010

(54) METHOD OF CONTROLLER AND DATA CARRIER DRIVE APPARATUS FOR CONTROLLING LOADING MEANS SUPPORTING A DATA CARRIER

(75) Inventor: Sander Jan Klerk, Son (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 767 days.

(21) Appl. No.: 11/575,686

(22) PCT Filed: Sep. 14, 2005

(86) PCT No.: PCT/IB2005/053014
§ 371 (c)(1),
(2), (4) Date: Mar. 21, 2007

(87) PCT Pub. No.: WO2006/033053
PCT Pub. Date: Mar. 30, 2006

(65) Prior Publication Data
US 2008/0013208 A1    Jan. 17, 2008

(30) Foreign Application Priority Data
Sep. 21, 2004   (EP) .................................. 04104566

(51) Int. Cl.
*G11B 7/085*   (2006.01)
*G11B 15/18*   (2006.01)
(52) U.S. Cl. .............. 369/30.27; 369/30.36; 360/99.07; 360/69; 720/606

(58) Field of Classification Search .............. 369/30.36, 369/30.27, 30.01, 77.21, 75.21, 77.11, 53.31, 369/47.53; 360/99.07, 99.03, 99.06, 69, 360/96.5, 94; 720/638.622, 647, 627, 606
See application file for complete search history.

(56) References Cited

U.S. PATENT DOCUMENTS

| 4,608,637 A | 8/1986 | Okuyama et al. |
| 4,722,078 A | 1/1988 | Nakanishi et al. |
| 4,996,625 A | 2/1991 | Soma et al. |
| 6,687,075 B1 | 2/2004 | Saito et al. |
| 6,722,754 B1 | 4/2004 | Delancy et al. |
| 6,922,378 B2 * | 7/2005 | Shen ....................... 369/30.27 |
| 6,944,871 B2 * | 9/2005 | Kabasawa ................... 720/647 |

FOREIGN PATENT DOCUMENTS

JP   2002367263 A   12/2002

* cited by examiner

*Primary Examiner*—Ali Neyzari

(57) ABSTRACT

A data carrier drive apparatus (1) comprises data carrier loading means (3) for supporting a data carrier, which data carrier loading means (3) is movable between an open and a closed end position along a traveling path by means of a loading means motor (4); and detection means (23, 25) being arranged to monitor an electric driving current ($I_M$) or a driving voltage ($U_M$) impressed to the loading means motor (4), wherein the detection means (23, 25) is adapted to detect a predefined signal pattern of the driving current ($I_M$) or voltage ($U_M$), which signal pattern is representative for the traveling of the loading means along its traveling path at a specific position or section of the path.

17 Claims, 3 Drawing Sheets

US 7,755,984 B2

METHOD OF CONTROLLER AND DATA CARRIER DRIVE APPARATUS FOR CONTROLLING LOADING MEANS SUPPORTING A DATA CARRIER

FIELD OF THE INVENTION

The invention relates to a method of controlling loading means supporting a data carrier of a data carrier drive apparatus, said data carrier loading means being movable between an open and a closed end position along a traveling path by means of a loading means motor.

The invention further relates to a controller for controlling loading means of a data carrier drive apparatus, wherein the data carrier loading means support a data carrier, said data carrier loading means being movable between an open and a closed end position along a traveling path by means of a loading means motor.

The invention further relates to a data carrier drive apparatus comprising:

data carrier loading means for supporting a data carrier, which data carrier loading means is movable between an open and a closed end position along a traveling path by means of a loading means motor.

BACKGROUND OF THE INVENTION

From the Japanese Patent Application Publ. No. 2002-367263 a loading controller for a loading device of an optical disk recording and reproducing device is known, which controller is constituted to move a disk tray of the loading device by impressing a driving voltage to a disk tray motor. In order to eliminate the need for an end-switch to switch off the driving voltage impressed to the disk tray motor at an end position of the disk tray, the driving voltage is impressed to the disk tray motor for a time period which exceeds the time period for the disk tray to be moved from an open position to a closed position or from the closed position to the open position by a predefined amount of time. The controller monitors the driving voltage or the driving current of the disk tray motor after starting, and when the current value exceeds a prescribed value or when the driving voltage falls below a prescribed value the controller assumes that the disk tray has reached the open position or the closed position. This prescribed value can be calibrated by pulling in the tray for a fixed time. After the time expired the value can be measured.

With the known device, however, it has proved to be a disadvantage that detection of an end position of the disk tray based on measuring the driving current or voltage and comparing it with an upper limit value or a lower limit value, respectively, disregards the fact that exceeding the upper limit or falling below the lower limit is possibly not due to stopping rotation of the motor when the disk tray has reached its end position, but may also be put down to blocking the disk tray during its travel between said end positions. There are no means provided to detect an absolute position of the disk tray.

OBJECT AND SUMMARY OF THE INVENTION

It is an object of the invention to provide a method of the type defined in the opening paragraph, a controller of the type defined in the second paragraph, and a data carrier drive apparatus defined in the third paragraph, wherein the disadvantages of prior art mentioned above are avoided.

In order to achieve the object defined above, with a method according to the invention characteristic features are provided so that a method according to the invention can be characterized in the way defined below, that is:

A method for controlling loading means supporting a data carrier of a data carrier drive apparatus, said data carrier loading means being movable between an open and a closed end position along a traveling path by means of a loading means motor, wherein the method comprises the steps of:

monitoring an electric driving current or a driving voltage impressed to the loading means motor, and detecting a predefined signal pattern of the driving current or voltage, which signal pattern is representative for the traveling of the loading means along its traveling path at a specific position or section of the path.

In order to achieve the object defined above, with a controller according to the invention characteristic features are provided so that a controller according to the invention can be characterized in the way defined below, that is:

A controller for controlling loading means of a data carrier drive apparatus, wherein the data carrier loading means support a data carrier, said data carrier loading means being movable between an open and a closed end position along a traveling path by means of a loading means motor, the controller being arranged to impress an electric driving current or a driving voltage to the loading means motor, wherein the controller comprises:

detection means being arranged to monitor the electric driving current or driving voltage impressed to the loading means motor, wherein the detection means is adapted to detect a predefined signal pattern of the driving current or voltage, which signal pattern is representative for the traveling of the loading means along its traveling path at a specific position or section of the path.

In order to achieve the object defined above, with a data carrier drive apparatus according to the invention characteristic features are provided so that a data carrier drive apparatus according to the invention can be characterized in the way defined below, that is:

A data carrier drive apparatus comprising:

data carrier loading means for supporting a data carrier, which data carrier loading means is movable between an open and a closed end position along a traveling path by means of a loading means motor;

detection means being arranged to monitor an electric driving current or a driving voltage impressed to the loading means motor, wherein the detection means is adapted to detect a predefined signal pattern of the driving current or voltage, which signal pattern is representative for the traveling of the loading means along its traveling path at a specific position or section of the path.

The characteristic features according to the invention provide the advantage that absolute positions of the loading means along its traveling path are detected, not only relative positions as with prior art devices. Particularly, the closed end position of the loading means is exactly detected without the need for additional hardware parts like end switches. Another advantage of the present invention is the increased detection speed in comparison to known devices. Since the inventive detection of the position of the loading means does not require a driving current or driving voltage to be impressed to the loading means motor for a time period longer than it takes to move the loading means from its open end position to its closed end position and vice versa a faster access to the data carrier can be achieved. Further, blocking the loading means for any reason during its travel along the travel path can safely be discriminated from stopping of the loading means at its predetermined end position. Thus, by the features of the invention the detection whether the loading means has arrived at a predetermined position can be done with higher precision.

The measures as claimed in claim 2 or claim 7 or claim 12, respectively, provide the advantage that blocking the loading means, e.g. just before its closed end position, can be detected and discriminated from stopping the loading means at its closed end position, by measuring the time between the driving current peaks or driving voltage notches. It is a characteristic feature of most loading means that very close to their closed end position they alter their direction of movement or are imparted an additional moving component the direction of which differs from the main moving component. E.g., the loading means is lifted to some extent in order to achieve locking. This altered moving direction or additional moving component results in peaks of the driving current and notches of the driving voltage impressed to the loading means motor, respectively, the occurrence of these peaks or notches is characteristic for the loading means at this particular position of its travel.

The measures as claimed in claim 3 or claim 8 or claim 13, respectively, provide the advantage that in case the resistance to moving the loading means is gradually increasing or decreasing at a certain section of the travel path during its travel, which gradual changing resistance results in ascending or descending signal slopes of the driving current or voltage, the resulting signal slopes will be detected and associated with a predetermined section of the travel path.

The measures as claimed in claim 4 or claim 9 or claim 14, respectively, provide the advantage that unintentional blocking of the loading means during its travel, which typically results in a driving current signal that immediately increases to a maximum value and will remain at this maximum value, can be discriminated from situations where temporarily a strong resistance to moving of the loading means occurs but does not result in blocking of the loading means.

The measures as claimed in claim 5 provide the advantage that a signal indicating that the loading means has reached its predetermined position is generated which can be used to trigger consecutive operations and/or the loading means motor is automatically stopped at the predetermined position. These functions have conventionally been fulfilled by a mechanical or optical switch.

It has proved to be particularly advantageous if the measures of claim 10 are provided. This achieves the advantage that various signal patterns can be detected that may have a considerably complex character. Further, a controller with these inventive features is adapted to be packed in a highly integrated circuit.

The measures as claimed in claim 15 or claim 16, respectively, provide the advantage that varying resistance to movement of the loading means can be provided which allows for defining various positions along the travel path of the loading means, which positions can be detected by the features according to the invention.

The measures as claimed in claim 17 provide the advantage that the invention is applicable to most existing disk and tape drive apparatuses in consumer electronics and computer industries, like CDROM-, DVD- and BD-drives or tape drives.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment to which the invention is not limited, however.

DESCRIPTION OF EMBODIMENTS

Figure 1:
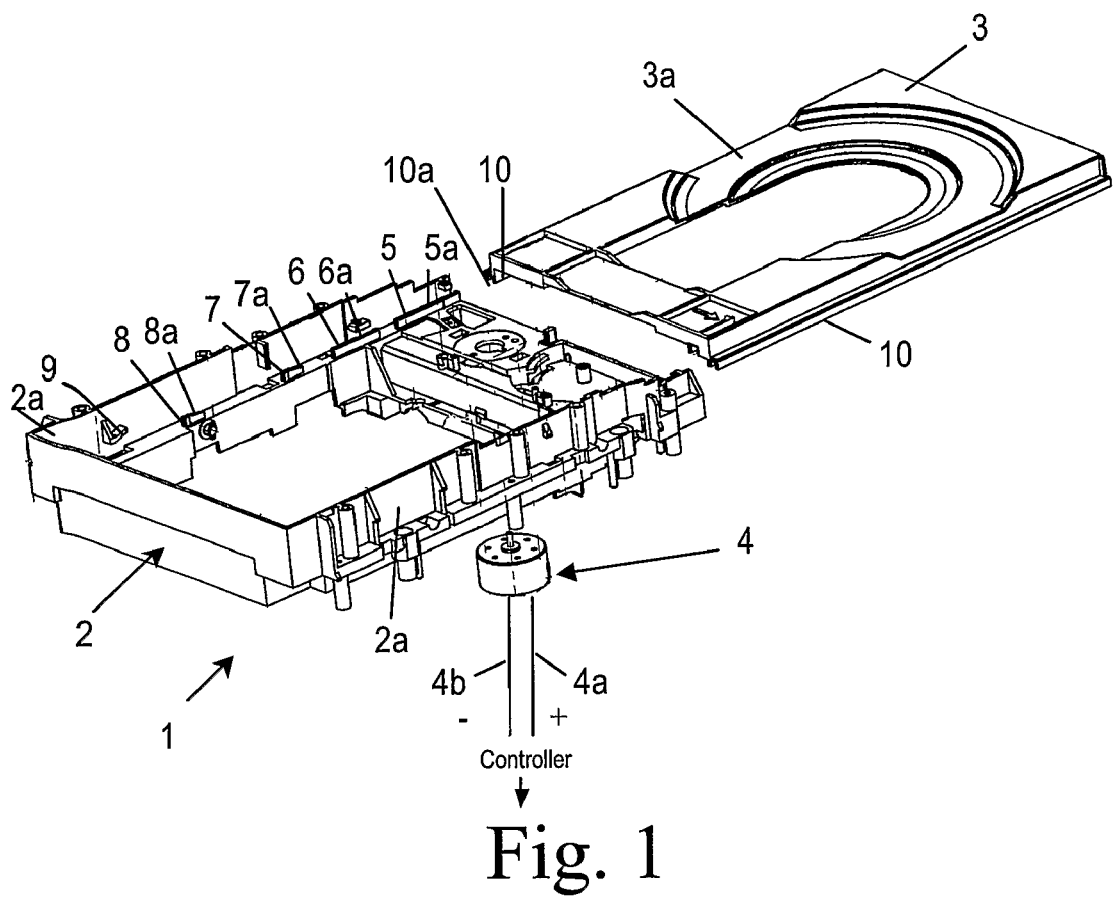
FIG. 1 shows a data carrier drive apparatus according to the invention in perspective and exploded view.

FIG. 1 shows a data carrier drive apparatus according to the invention in perspective and exploded view. This data carrier drive apparatus 1 is configured as a disk drive apparatus, like a compact disk drive for consumer electronic devices, or a CD-ROM, DVD or BD drive for use in computers. For the sake of clarity all those parts of the disk drive apparatus which are not directly related to the invention have been omitted from the drawing. The omitted parts comprise scanning means for the disk, like laser diodes, and driving means for the scanning means, comprising motors, coils and electronic circuits. Those parts are well-known to those skilled in the art and therefore do not need to be extensively explained.

FIG. 1 depicts a frame 2 of the disk drive apparatus 1 supporting loading means 3 in form of a disk tray and a loading means motor 4 in form of a disk tray motor. In the following description the loading means 3 will be referred to as disk tray and the loading means motor 4 will be referred to as disk tray motor. In the frame 2 a plurality of fins 5, 6, 7, 8 are provided in line at both side walls. Due to the perspective representation only the fins on one side wall can be seen in FIG. 1. These plurality of fins 5, 6, 7, 8 constitute a travel path for the disk tray 3 by being engaged by a groove 10a formed by a U-shaped profile 10, which profile 10 is attached to the bottom of the disk tray 3. The U-shaped profile slides on the fins 5, 6, 7, 8 so that it is movable between an open end position, wherein a disk-shaped data carrier can be put into a recess 3a formed in the disk tray 3, and a closed end position which is the operative position of the disk drive apparatus 1. The disk tray 3 is driven by disk tray motor 4 between its said end positions. As depicted in FIG. 1 the fins 5 and 6 are of rectangular form with their upper faces forming running surfaces 5a, 6a for the U-shaped profile 10. The running faces 5a, 6a of the fins 5, 6 are flat and in line. Hence, the sliding resistance imparted by said running faces 5a, 6a to the U-shaped profile 10 sliding thereon is essentially constant. On the other hand, the upper faces of the fins 7 and 8 are sloped so that they form upwardly sloped running surfaces 7a, 8a for the U-shaped profile 10 as seen in a direction of moving the disk tray 3 from its open end position to its closed end position. These upwardly sloped running surfaces 7a, 8a temporarily increase the resistance to movement of the loading means when the leading edge of U-shaped profile 10 impinges on the running surfaces 7a, 8a. This temporarily increased resistance results in a temporarily higher current consumption of the disk tray motor 4. Disk tray motor 4 is adapted as a DC motor and has two current supply wires 4a, 4b to be connected to a controller for impressing the necessary driving current or driving voltage, respectively, to the disk tray motor 4.

A stop 9 provided at the side wall 2a defines the closed stop position for the disk tray 3 when moving inwardly along the traveling path.

Figure 2:
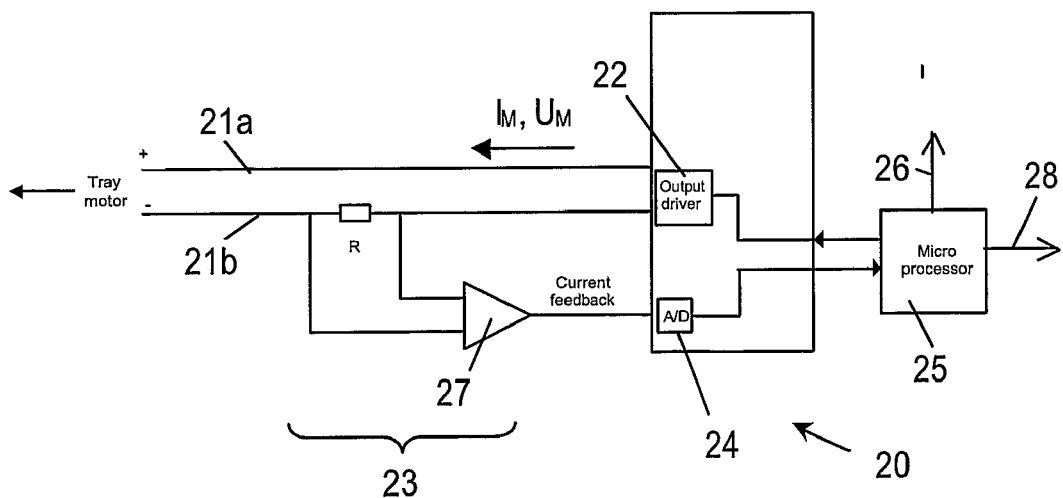
FIG. 2 shows a controller according to the invention in the form of a block circuit diagram.

Now reference is also made to FIG. 2 that shows a block circuit diagram of a controller 20 according to the invention. Controller 20 comprises an output driver 22 connected via lines 21a, 21b to the current supply wires 4a, 4b of the disk tray motor 4. The output driver 22 is adapted to impress an electric driving current $I_M$ or a driving voltage $U_M$ to the disk tray motor 4 in order to move the disk tray 3 from its open end position to its closed end position and vice versa. The controller 20 further comprises detection means for monitoring the electric driving current $I_M$ or driving voltage $U_M$ impressed to the disk tray motor 4. These detection means comprise a resistor R switched into line 21b. The voltage across resistor R is amplified by amplifier 27, the output signal is representative for the signal pattern of the driving current $I_M$ or voltage $U_M$ impressed to the disk tray motor 4 by the output driver 22. On the other hand, the output signal of amplifier 27 is also a current feedback signal which is used for controlling the output driver 22. The output signal of amplifier 27 is fed to the input of an analog-digital-converter (ADC) 24 for converting the output signal to digital signals. The digital output signal of ADC 24 is fed to an input of a microprocessor 25, which microprocessor 25 is adapted for comparing the digital output signal of the ADC with a predefined signal pattern of the driving current $I_M$ or the driving voltage $U_M$, as will be explained below with reference to FIG. 3.

Figure 4:
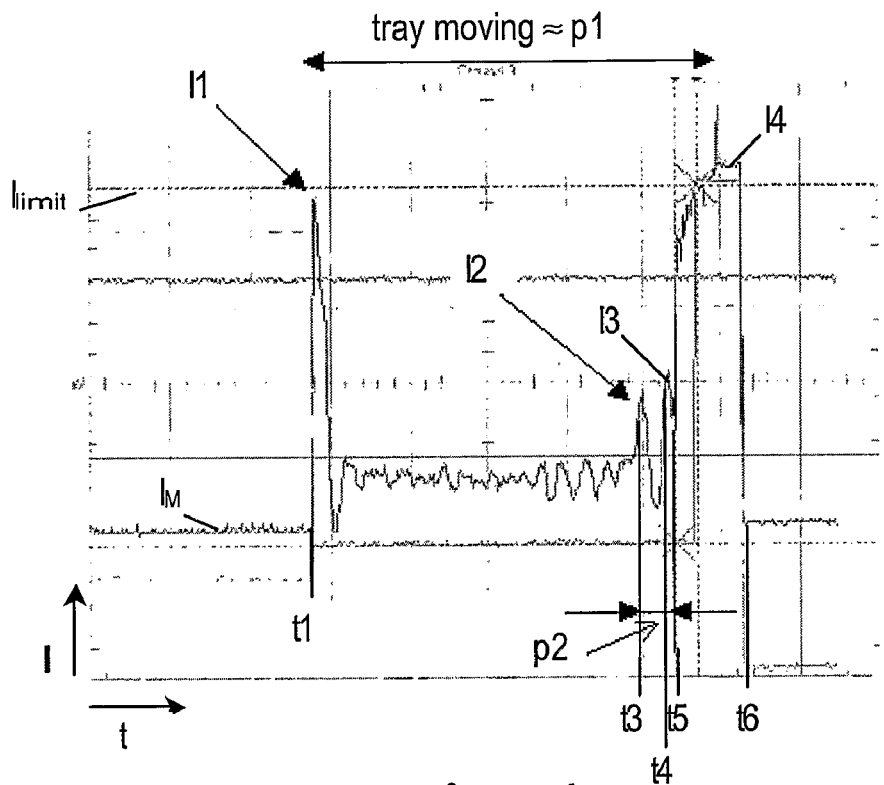
FIG. 4 shows a characteristic curve of a driving current impressed to a loading means motor when the loading means is moved from an open end position to a closed end position.

FIG. 4 shows a characteristic signal pattern of the driving current $I_M$ impressed to disk tray motor 4 when the disk tray 3 is moved from an open end position to a closed end position. A first peak I1 in the driving current $I_M$ appears at time t1 when the disk tray motor 4 is started and disk tray 3 is set into motion. After the falling edge of first (startup) peak I1 the driving current $I_M$ appears relatively constant for a longer time period until the leading edge 10a of U-shaped profile 10 of the disk tray 3 impinges on the sloped running surface 7a of fin 7, which results in lifting of the tray 3 to some extent, which in turn causes a second peak I2 in the driving current $I_M$ at time t3 in order to overcome the increased resistance to moving the disk tray 3. After the "obstacle" of sloped running surface 7a has been overcome by the disk tray 3, the driving current $I_M$ returns to a lower level. A short time later, i.e. at time t4, the same effect occurs once more when the leading edge 10a of the U-shaped profile 10 of the disk tray 3 impinges on the sloped running surface 8a of fin 8, which again results in lifting of the tray 3 associated with a third peak I3 in the driving current $I_M$ which third peak I3 is necessary to overcome the increased resistance to moving the disk tray 3. Shortly after disk tray 3 has been lifted by the running surface 8a, disk tray 3 impacts against stop 9 where it is halted. This causes the disk tray motor 4 to consume the maximum driving current (blocking current I4 at time t5) until the output driver 22 is switched off by micro processor 25. A time period p1 is defined by:

$$p1 = t5 - t1$$

approximately corresponding to the time period necessary for moving the disk tray 3 the entire path from its open end position to its closed end position. It should be noted that time t5 is defined as the starting point of the rise of driving current $I_M$ to blocking current I4, but actually the disk tray 3 stops somewhere between time t5 and the time when driving current $I_M$ has definitely reached the level of blocking current I4.

Figure 3:
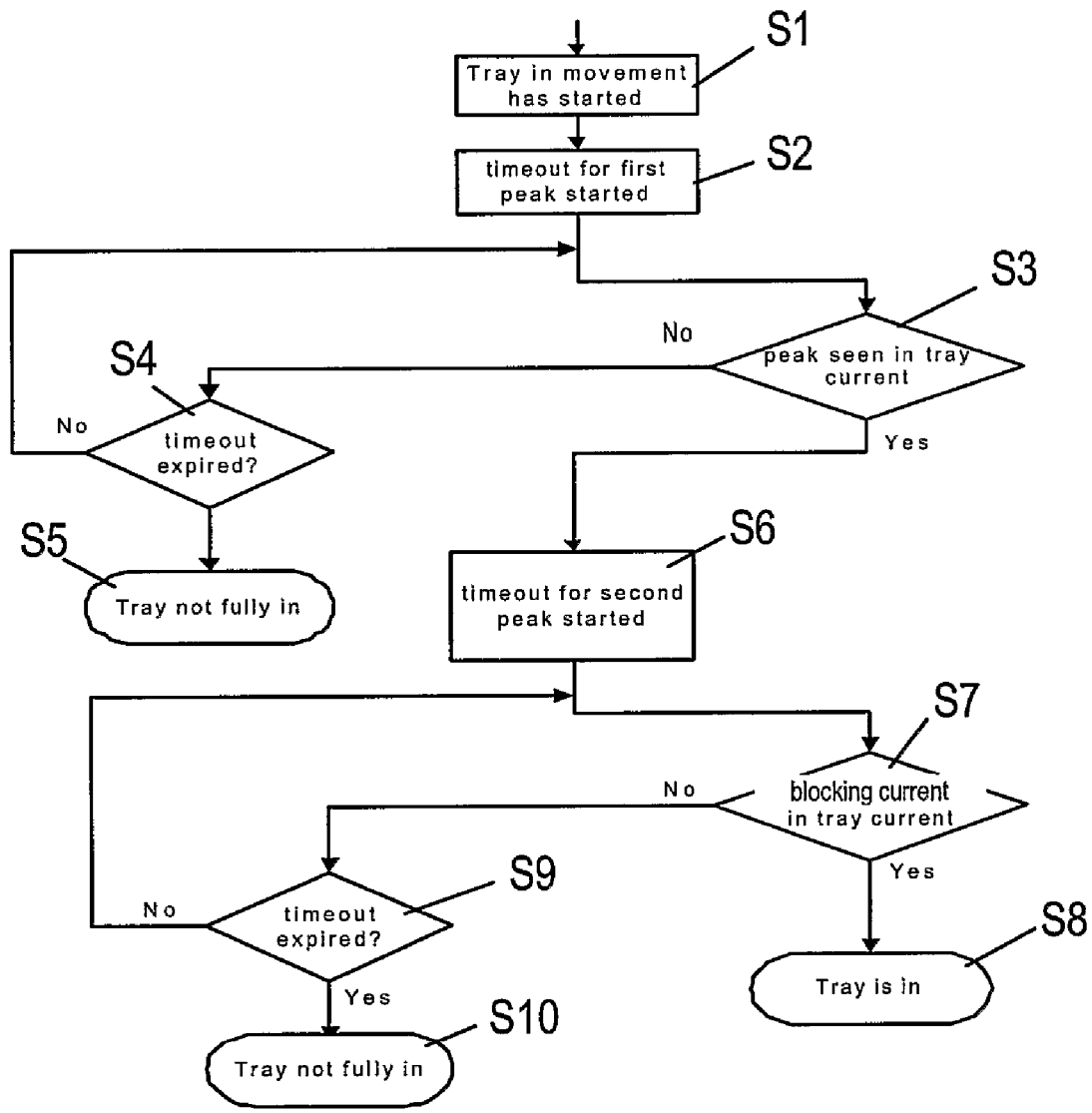
FIG. 3 shows a method according to the invention in the form of a flow chart.

Now reference is made to the flow chart of FIG. 3 that shows the inventive method according to which microprocessor 25 compares the digital output signal of the ADC 24 with a predefined signal pattern of the driving current $I_M$, wherein the predefined signal pattern of the driving current $I_M$ is that being depicted in FIG. 4. In the first step S1 the microprocessor 25 initiates movement of the disk tray 3 from its open end position in direction to its closed end position by instructing the output driver 22 to impress a drive current $I_M$ to the disk drive motor 4. This results in the first peak I1 of the current $I_M$ at time t1 (see FIG. 4). In step S2 this first current peak I1 triggers an internal timeout counter set to time period p1, i.e. approx. the time period necessary for moving the disk tray 3 from its open end position to its closed end position. In step S3 it is discriminated whether another current peak has occurred. If such another current peak has not yet occurred, the processing branches to step S4 where it is discriminated whether the timeout counter (that had been triggered in step S1) has expired. If so, the microprocessor 25 decides that the disk tray 3 has unintentionally been blocked during its travel along the travel path, so that the disk tray 3 is not fully retracted to its closed end position. In this case the microprocessor switches off the output driver 22 and optionally outputs a blocking signal 28 (see FIG. 2).

Figure 5:
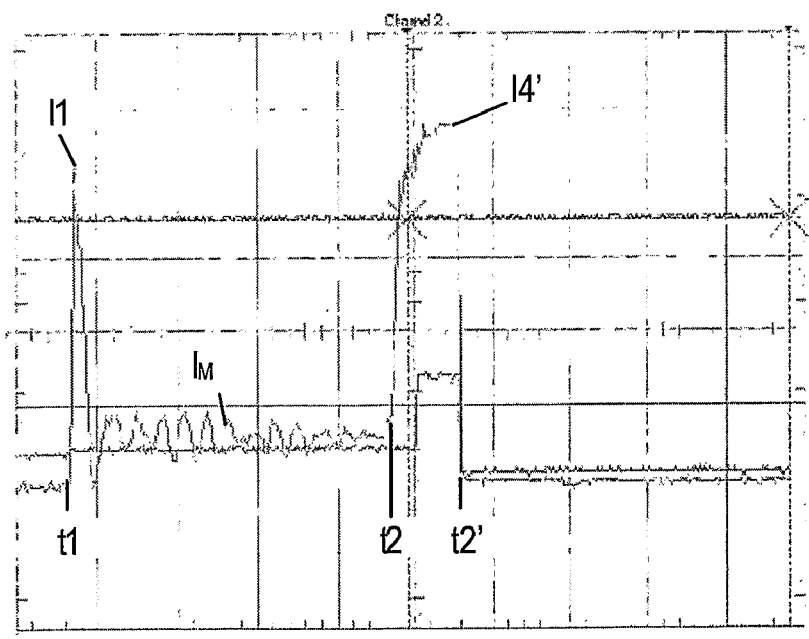
FIG. 5 shows a characteristic curve of a driving current impressed to a loading means motor when the loading means is unintentionally blocked.

A characteristic curve of driving current $I_M$ impressed to disk tray motor 4 in a state when the disk tray 3 is unintentionally blocked is shown in FIG. 5. The first peak I1 in the driving current $I_M$ had appeared at time t1 when the disk tray motor 4 was started and disk tray 3 was set into motion. At time t2 some unforeseen event causes the disk tray 3 to stop, which in turn causes the disk tray motor 4 to consume the maximum driving current (blocking current I4' at time t2) until the output driver 22 is switched off by micro processor 25 at time t2'.

Now returning to explanation of the method according to the flow chart of FIG. 3 it is assumed that in step S3 another current peak has been detected (peak I2 at time t3). This triggers another timeout counter set to a time period p2 which is defined as the time period within which the disk tray 3 having passed the reference position at fin 7 that caused the impressed current to jump to current peak I2 should have reached its closed end position causing the impressed current to jump to blocking current I4. In step S7 it is discriminated whether blocking current I4 has occurred. If so, it is decided in step S8 that the disk tray 3 has reached its closed end position and the output driver 22 and hence the current to the disk tray motor 4 is switched off at time t6. Optionally, the microprocessor outputs an end position detection signal 26 (see FIG. 2). On the other hand, if in step S7 the blocking current I4 has not yet occurred further processing branches to step S9 where it is discriminated whether the timeout counter for time period p2 (that had been triggered in step S6) has expired. If so, the microprocessor 25 decides that the disk tray 3 has for whatever reason not fully been retracted to its closed end position. Otherwise processing jumps to step S7.

It should be observed that the microprocessor is adapted to discriminate between peaks which—in this example—are defined as current values lying below an upper current limit value $I_{limit}$ and the blocking current the amplitude of which lies above the upper current limit value $I_{limit}$.

In the above explained embodiment of the method according to the invention it is further assumed that the time period p2 that is calculated by the formula:

$p2=t5-t3$ is quite small so that no unintentional blocking of the disk tray is to be expected within this time period p2, but focuses on detection of the disk tray remaining open to some extent for whatever reason.

However, it should be observed that this embodiment of the method according to the invention may be varied in various ways. For instance, another time period could be monitored, namely the time period between occurrence of the second current peak I2 at time t3 and occurrence of the third current peak I3 at time t4, which third current peak I3 is caused by the sloped running surface 8a of fin 8. In another embodiment, instead of monitoring time period p2 another time period defined as the difference between time t5 (occurrence of blocking current when disk tray 3 has reached its closed end position) and time t4 of the third current peak I3 could be monitored. The latter time period is much smaller than period p2, so blocking of the disk tray 3 within this period is very unlikely.

It should further be observed that the signal pattern to be analyzed by microprocessor 25 may also contain one or more ascending or descending signal slopes the length and/or the gradient of which lie within a predefined range of values, or the like.

If a representation of an average value of the signal is stored in the microprocessor, variations in friction and/or changes in roughness of the surfaces can be detected.

It should further be observed that the resistance the running surfaces 5a, 6a, 7, 8a provide to sliding of the U-shaped profile 10 can be adjusted in various ways, e.g. by covering said running surfaces with coatings having different coefficients of friction, or by roughening the surfaces.

The invention claimed is:

1. A method for controlling loading means (3) supporting a data carrier of a data carrier drive apparatus (1), said data carrier loading means (3) being movable between an open and a closed end position along a traveling path by means of a loading means motor (4), wherein the method comprises the steps of:
    monitoring an electric driving current ($I_M$) or a driving voltage ($U_M$) impressed to the loading means motor (4), and detecting a predefined signal pattern of the driving current ($I_M$) or voltage ($U_M$), which signal pattern is representative for the traveling of the loading means along its traveling path at a specific position or section of the path.

2. A method as claimed in claim 1, wherein detecting the signal pattern comprises detecting a plurality of peaks (I2, I3) or notches occurring within predefined time intervals.

3. A method as claimed in claim 1, wherein detecting the signal pattern comprises detecting at least one ascending or descending signal slope the length and/or the gradient of which lie within a predefined range of values.

4. A method as claimed in claim 1, wherein detecting the signal pattern comprises detecting at least one peak or notch with a predefined maximum length and a predefined minimum amplitude.

5. A method as claimed in claim 1, wherein in case that the signal pattern is detected an output signal (26) is generated and/or impressing the electric driving current ($I_M$) or driving voltage ($U_M$) to the loading means motor (4) is stopped.

6. A controller (20) for controlling loading means (3) of a data carrier drive apparatus (1), wherein the data carrier loading means (3) support a data carrier, said data carrier loading means (3) being movable between an open and a closed end position along a traveling path by means of a loading means motor (4), the controller (20) being arranged to impress an electric driving current ($I_M$) or a driving voltage ($U_M$) to the loading means motor, wherein the controller comprises:
    detection means (23, 25) being arranged to monitor the electric driving current ($I_M$) or driving voltage ($U_M$) impressed to the loading means motor (4), wherein the detection means (23, 25) is adapted to detect a predefined signal pattern of the driving current or voltage, which signal pattern is representative for the traveling of the loading means along its traveling path at a specific position or section of the path.

7. A controller as claimed in claim 6, wherein the signal pattern comprises a plurality of peaks (I3, I4) or notches occurring within predefined time intervals.

8. A controller as claimed in claim 6, wherein the signal pattern comprises at least one ascending or descending signal slope the length and/or the gradient of which lie within a predefined range of values.

9. A controller as claimed in claim 6, wherein the signal pattern comprises at least one peak or notch with a predefined maximum length and a predefined minimum amplitude.

10. A controller as claimed in claim 6, wherein the detection means (23) comprises a current/voltage sensor (R, 27), an analog-digital-converter (ADC) (24) for converting the output signals of the current/voltage sensor to digital signals, and a microprocessor (25) or a digital signal processor for comparing the digital output signal of the ADC with the predefined signal pattern.

11. A data carrier drive apparatus (1) comprising:
    data carrier loading means (3) for supporting a data carrier, which data carrier loading means (3) is movable between an open and a closed end position along a traveling path by means of a loading means motor (4);
    detection means (23, 25) being arranged to monitor an electric driving current ($I_M$) or a driving voltage ($U_M$) impressed to the loading means motor (4), wherein the detection means (23, 25) is adapted to detect a predefined signal pattern of the driving current ($I_M$) or voltage ($U_M$), which signal pattern is representative for the traveling of the loading means along its traveling path at a specific position or section of the path.

12. A data carrier drive apparatus as claimed in claim 11, wherein the signal pattern comprises a plurality of peaks (I3, I4) or notches occurring within predefined time intervals.

13. A data carrier drive apparatus as claimed in claim 11, wherein the signal pattern comprises at least one ascending or descending signal slope the length and/or the gradient of which lie within a predefined range of values.

14. A data carrier drive apparatus as claimed in claim 11, wherein the signal pattern comprises at least one peak or notch with a predefined maximum length and a predefined minimum amplitude.

15. A data carrier drive apparatus as claimed in claim 11, wherein the traveling path is defined by guiding means (5, 6, 7, 8) for guiding the loading means (3), the guiding means (5, 6, 7, 8) being adapted to provide varying resistance to movement of the loading means (3).

16. A data carrier drive apparatus as claimed in claim 15, wherein the guiding means (5, 6, 7, 8) are formed as a slide with sloped slides path sections and/or slide path sections with varying coefficients of friction.

17. A data carrier drive apparatus as claimed in claim 11, wherein the loading means (3) is adapted as a tray for carrying a disk, cartridge or tape.

* * * * *